United States Patent [19]
Loppoli

[11] Patent Number: 5,820,043
[45] Date of Patent: Oct. 13, 1998

[54] CUTTER-MIXER WAGON FOR THE RECYCLING OF PLANT RESIDUES WITH PERFECTED CONVEYOR BELT

[75] Inventor: Giuseppe Loppoli, Grantorto, Italy

[73] Assignee: Seko SPA, Curtarolo, Italy

[21] Appl. No.: 981,089

[22] PCT Filed: Mar. 6, 1996

[86] PCT No.: PCT/EP96/00949

§ 371 Date: Dec. 12, 1997

§ 102(e) Date: Dec. 12, 1997

[87] PCT Pub. No.: WO96/41515

PCT Pub. Date: Dec. 27, 1996

[51] Int. Cl.[6] .................................................. B02C 21/02
[52] U.S. Cl. ............................... 241/101.76; 241/186.35; 241/260.1; 241/605
[58] Field of Search ....................... 241/101.742, 101.76, 241/186.35, 260.1, 605; 414/523

[56] References Cited

U.S. PATENT DOCUMENTS

| | | | |
|---|---|---|---|
| 1,403,084 | 1/1922 | James ........................................ | 414/523 |
| 1,436,428 | 11/1922 | Barkmann et al. ....................... | 414/523 |
| 1,515,328 | 11/1924 | Barkmann et al. ....................... | 414/505 |
| 2,419,824 | 4/1947 | Davis ........................................ | 414/489 |
| 4,062,498 | 12/1977 | Szepaniak .............................. | 241/101.7 |
| 5,402,950 | 4/1995 | Blair et al. ............................ | 241/101.7 |
| 5,452,861 | 9/1995 | Faccia .................................. | 241/101.72 |
| 5,622,323 | 4/1997 | Krueger et al. ...................... | 241/101.76 |
| 5,676,320 | 10/1997 | Merklinger ......................... | 241/101.741 |

*Primary Examiner*—John M. Husar
*Attorney, Agent, or Firm*—Watson Cole Grindle Watson P.L.L.C.

[57] ABSTRACT

The invention is a cutter-mixer wagon (1) for plant residues, comprising: a container (2) provided with an opening (21) for the introduction of said plant residues to be processed; a pair of rotary screw feeders (4) for cutting said plant residues; a conveyor belt (5) for the extraction of the cut and mixed material (23), positioned in correspondence with an unloading door (22) and supported by a frame (6) connected to said container (2) through oscillation means (7) and sliding means (8). Operating means (9) are provided to obtain the oscillation of said frame (6) around said oscillation means (7), in order to place said conveyor belt in a substantially vertical position when it is at rest and to incline it when it is in working position.

15 Claims, 2 Drawing Sheets

CUTTER-MIXER WAGON FOR THE RECYCLING OF PLANT RESIDUES WITH PERFECTED CONVEYOR BELT

The invention is a cutter-mixer wagon for the recycling of plant residues, provided with a perfected conveyor belt for the extraction of the processed material.

It is well known that the composting of plant residues obtained by cutting plant residues and mixing them with other components is becoming a more and more important method for the production of fertilizers. This method, in fact, has no environmental impact and at the same time makes it possible to dispose of and reuse the plant residues produced through the maintenance of parks, orchards, gardens, woods and alike, which, as it is known, have very high fertilizing properties.

For the crushing of plant residues cutter-mixer wagons of the known kinds are generally used, in which the plant residues are loaded manually or by means of mechanical loaders or fork trucks, taking the plant residues from the ground or from appropriate areas where they have been heaped. As far as the disposal of plant residues in urban centres is concerned, they are put in special skips and this happens especially in those countries where the differentiated collection of waste is provided. The skips are transported near the cutter-mixer wagon or, alternatively, the plant residues are collected with any transport means and then transferred into the cutter-mixer wagon by means of the already mentioned manual loading devices, mechanical loaders or fork trucks.

The cutter-mixer wagons are provided with an unloading door in correspondence of which there is a device for the extraction of the cut and mixed material, which must be heaped, so that it can successively be collected and distributed on the areas to be fertilized.

Said extraction device comprises a conveyor belt, supported by a frame hinged to the cutter-mixer wagon, which, when it is in working position, is inclined in such a way as to be capable of unloading the material outside the cutter-mixer wagon, forming a heap.

One of the drawbacks of these conveyor belts is represented by the fact that, being inclined with respect to the cutter-mixer wagon to which they are hinged, they protrude from the outline of the cutter-mixer itself, especially when their length is considerable.

This creates handling problems when the cutter-mixer wagon must be moved from a working area to another.

There are some applications in which, in order to avoid said inconvenience, the conveyor belt is made up of two articulated parts, so that when it is at rest the two parts are bent with respect to each other and adhere to the walls of the cutter-mixer wagon, so that it is less cumbersome.

Solutions of this kind, though eliminating the problem of the conveyor belt that protrudes with respect to the wagon when this is at rest, are more difficult to carry out and therefore more expensive.

The present invention aims at eliminating said drawback through the implementation of a cutter-mixer wagon for the recycling of plant residues, provided with a conveyor belt for the extraction of the processed material, which, when at rest, adheres to the walls of the cutter-mixer wagon though being made of a single piece.

The above goal is achieved through the implementation of a cutter-mixer wagon for plant residues, which, according to the main claim, comprises:

a container, mounted on wheels and provided with at least an opening for the introduction of said plant residues to be processed;

at least one rotary screw feeder positioned on the bottom of said container and suitable for cutting said plant residues;

at least one unloading door positioned on at least one side of said container;

a conveyor belt for the extraction of the cut and mixed material, said conveyor belt being positioned in correspondence with said unloading door and supported by a frame connected to said container through connecting means, said cutter-mixer wagon being characterized in that said connecting means comprise oscillation means that connect said container to an intermediate point of said frame supporting said conveyor belt and sliding means that connect said container to the lower part of said frame, with operating means being connected to said container and to said frame and carrying out the reciprocal movement of said sliding means to obtain the oscillation of said frame around said oscillation means, in order to arrange said conveyor belt in a substantially vertical position and to make it adhere to the container when it is at rest and to inclining it and make it diverge from the container when it is in working position.

According to a favourite application, said oscillation means comprise a rod, one end of which is rotatingly connected to said container, while the other end is rotatingly connected to said frame in an intermediate point, while said sliding means consist of a pin fixed to the lower part of said frame, said pin being slidingly connected to a slot made in a bracket fixed to said container. Said mechanical operating means comprise an hydraulic or pneumatic jack, in which the cylinder is fixed to the container and the rod end is rotatingly connected to a support positioned under the bracket, said bracket being fixed to the container and being provided with a slot for the sliding of the pin belonging to the frame.

To advantage, when the conveyor belt is at rest, it is vertical and adheres to the side wall of the container of the cutter-mixer wagon, so that its dimensions are reduced as much as possible and that the movements of the cutter-mixer wagon are not hindered.

The cutter-mixer wagon object of the invention is described here below with reference to the attached drawings, wherein.

Figure 1:
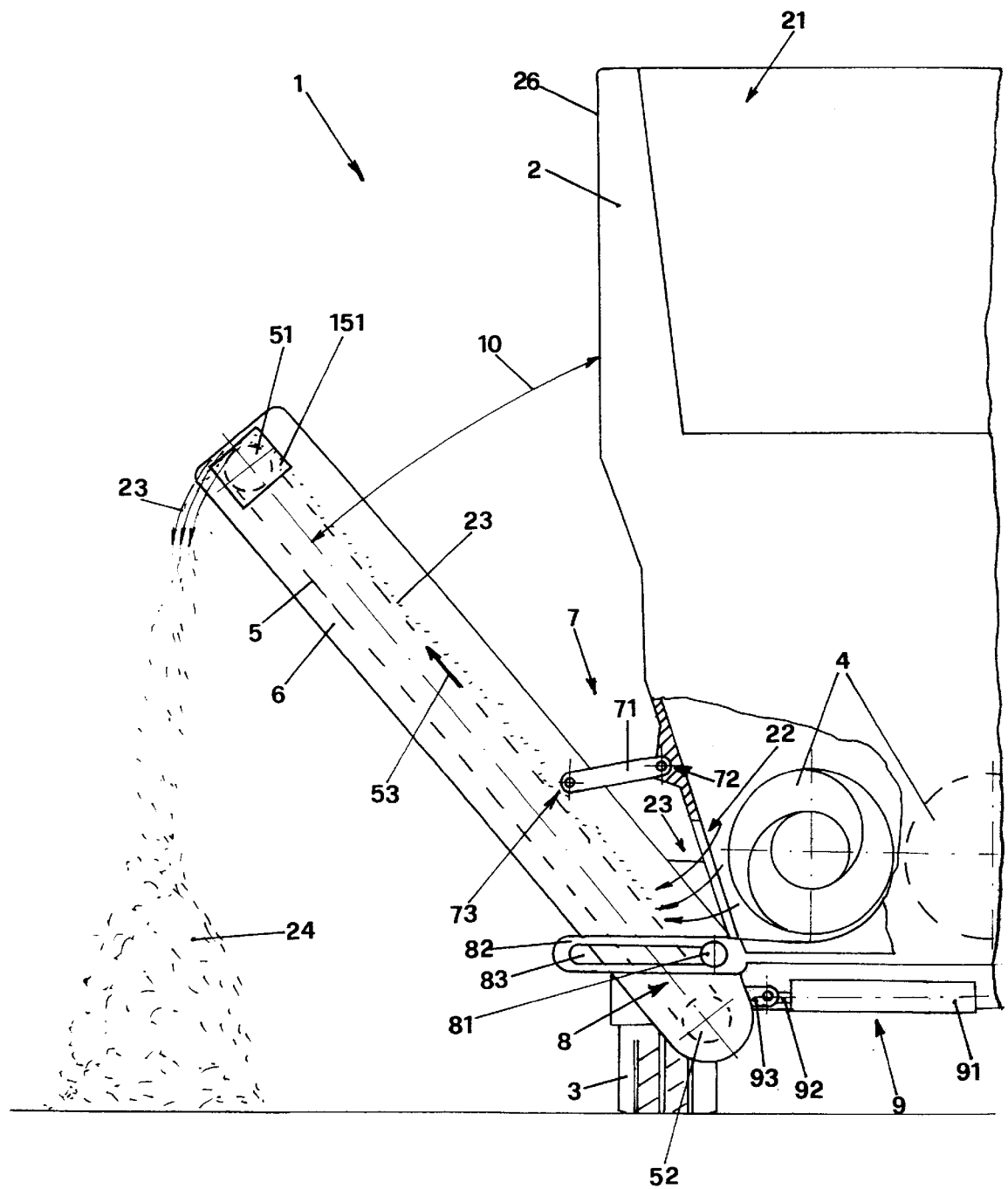
FIG. 1 shows the cutter-mixer wagon object of the invention with the conveyor belt in working position.

As shown in FIG. 1, the cutter-mixer wagon object of the invention, indicated as a whole by 1, comprises a container 2 mounted on wheels 3, provided with an opening 21 for the introduction of the plant residues to be cut by means of a pair of rotary screw feeders 4 positioned on the bottom of the container 2.

It can also be observed that said container 2 is provided with an unloading door 22 through which the cut and mixed material 23 is conveyed on a conveyor belt 5 positioned in front of the unloading door 22 and through which said material is conveyed outside the container 2 itself, forming the heap 24.

Said conveyor belt 5, as it can be observed, is positioned between a pair of drums 51 and 52, which are supported by a frame 6, while an hydraulic motor 151 is coupled to at least one of said drums, for example drum 51, and sets it in rotation by making the belt 5 advance in the direction 53.

Further, the frame 6 is mechanically connected to the container 2 through connecting means. More particularly, it can be observed that said connection means comprise oscillation means, indicated as a whole by 7, which connect said container 2 to the frame 6 in an intermediate point and sliding means, indicated as a whole by 8, which connect the container 2 itself to the lower part of the frame 6 itself.

As regards the oscillation means 7, it can be observed that they comprise a pair of rods 71, positioned one on each side of the frame 6 and each one having a first end 72 hinged to the container 2 and the second end 73 hinged to the frame 6. FIG. 1 shows only one of said rods 71, since the other one, being positioned symmetrically, cannot be seen.

It must be underlined that in a different embodiment said oscillation means 7 can also consist of a single rod 71 connected to the frame 6 in an intermediate point, rather than of two rods 71.

As regards said sliding means 8, it can be observed that they comprise a pair of pins 81 fixed to the sides of the frame 6 and a pair of brackets 82 fixed to said container 2, each one of which is provided with a slot 83 to which one of said pins 81 is slidingly coupled. Also in this case said pins 81 and said brackets 82 are positioned symmetrically with respect to the frame 6 that supports the conveyor belt 5. In a different application a single pin 81 may be fixed to said frame 6 in an intermediate point and may be coupled to the slot 83 of a single bracket 82 fixed to said container 2.

Finally, it can be observed that the cutter-mixer wagon object of the invention comprises also operating means consisting of a preferably hydraulic or, alternatively, pneumatic jack 9, in which the cylinder 91 is fixed in correspondence with the bottom of the container 2 and the stem 92 is hinged to a support 93 fixed to the lower parts of the frame 6 that supports the conveyor belt 5. In a different application said operating means may also consist of more than one hydraulic or pneumatic jack 9 or of other means.

As already explained, FIG. 1 shows the conveyor belt 5 in working position, and precisely while extracting the material 23 from the container 2, and it can be observed that in this position it is inclined of an angle 10 with respect to the vertical wall 26 of the container 2, since the stem 92 of the actuator 9 is completely inside the cylinder 91 and therefore the pin 81 of the sliding means 8 is positioned completely backward inside the slot 83.

Figure 2:
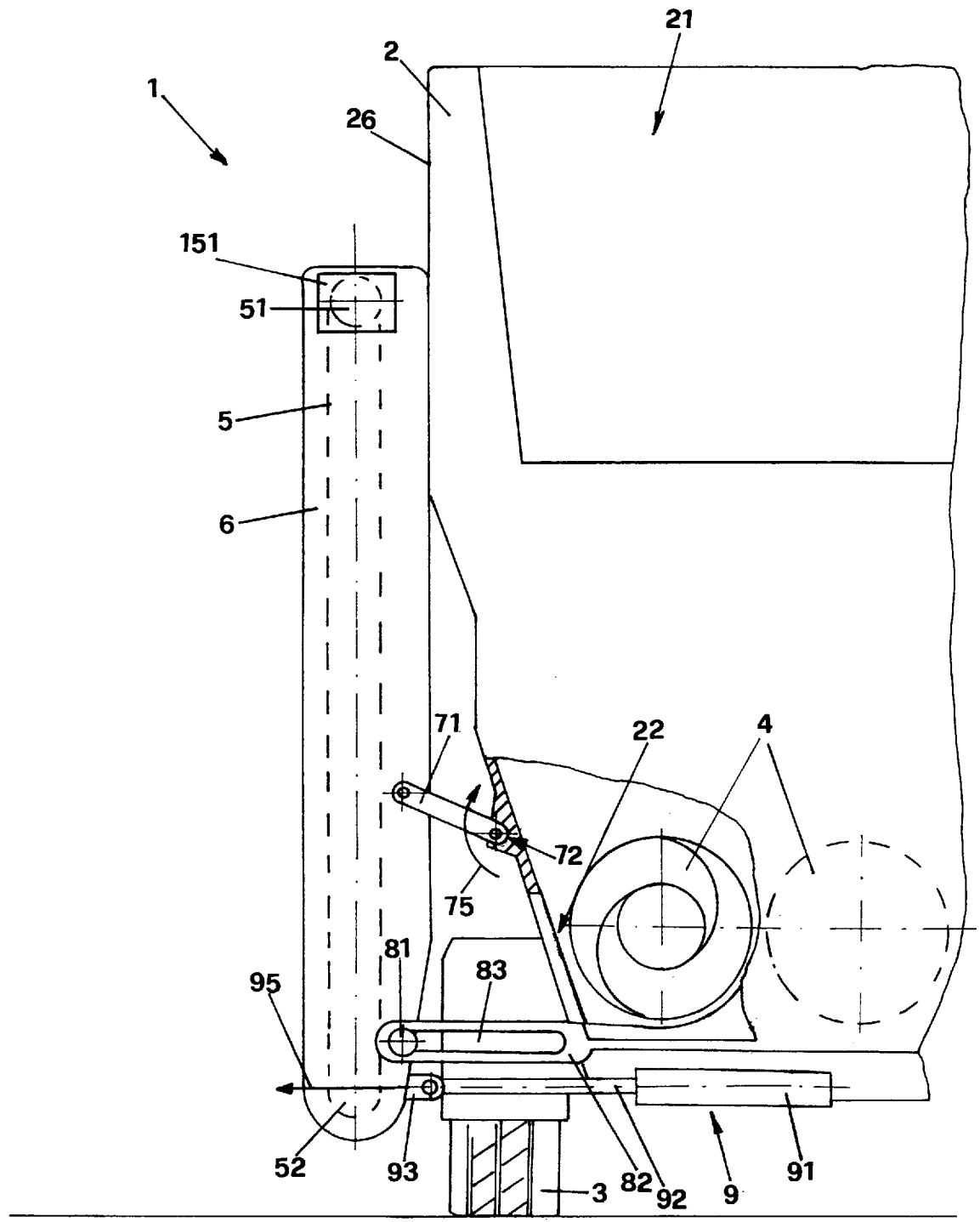
FIG. 2 shows the cutter-mixer wagon of the invention with the conveyor belt at rest.

When the operator wants to arrange the conveyor belt 5 in the least encumbering position, which would be more suitable for moving the cutter-mixer wagon represented in FIG. 2, that is, in the position where the frame 6 that supports the conveyor belt itself adheres to the wall 26 of the container 2, it is sufficient to convey pressurized oil or air, according to the case, to the jack 9, in such a way to push the stem 92 out. In this case, as shown in FIG. 2, the pressure on the frame 6 of the conveyor belt 5 pushes the latter outwards in direction 95 and during this stroke it is guided by the pins 81, each one of which keeps it inside the slot 83 obtained in the bracket 82. At the same time, the rod 71 rotates anticlockwise 75 on the pin 72 that connects it to the container 2, so that all the frame 6 oscillates due to the combination of a rotary movement with direction 75 and of an horizontal shift with direction 95 and is brought to the position shown in FIG. 2, adjacent to the vertical wall 26 of the container 2.

When the conveyor belt is in such position, it doesn't hinder the movements of the cutter-mixer wagon, which can therefore be easily moved to any other place.

According to the above description, the cutter-mixer wagon object of the present invention achieves the fixed goals.

As first thing, the invention achieves the aim to implement a cutter-mixer wagon provided with a conveyor belt that, when at rest, does not protrude too much with respect to the width of the cutter-mixer wagon itself and therefore does not hinder its movements.

The invention also achieves the goal to obtain such reduced dimensions of the conveyor belt without the need to manufacture it with articulated parts, like the models available on the market, which are rather expensive.

Upon implementation certain changes may be made to the construction characteristics of the conveyor belt and of the frame that supports it, as well as modifications to the pins and slots that form the sliding means, or to the rods that form the oscillation means.

Further, the rotation of the conveyor belt can be obtained through kinematic motions of any kind, preferably through an hydraulic motor positioned coaxially to one of the drums that support it and similarly the shift of the frame supporting the conveyor belt can be obtained by means of pneumatic or hydraulic actuators that can be chosen by the manufacturer.

Said variants and any other modification, however, are to be considered as completely protected by the present invention.

I claim:

1. Cutter-mixer wagon (1) for plant residues, comprising:
    a container (2) mounted on wheels (3) and provided with at least an opening (21) for the introduction of said plant residues to be processed;
    at least one rotary screw feeder (4) positioned on the bottom of said container (2) for the cutting of said plant residues;
    at least one unloading door (22) positioned on at least one side of said container;
    a conveyor belt (5) for the extraction of the cut and mixed material (23), said conveyor belt (5) being positioned in correspondence with said unloading door (22) and supported by a frame (6) connected to said container (2) through connecting means, wherein said connecting means comprise oscillation means (7) that connect said container (2) to an intermediate point of said frame (6) supporting said conveyor belt (5) and sliding means (8) that connect said container (2) to the lower part of said frame (6), with operating means (9) being connected to said container (2) and to said frame (6) and carrying out the reciprocal movement of said sliding means (8) to obtain the oscillation of said frame (6) around said oscillation means (7), in order to arrange said conveyor belt (5) in a substantially vertical position and to make it adhere to the container (2) when it is at rest and to incline it and make it diverge from the container (2) when it is in working position.

2. Cutter-mixer wagon (1) according to claim 1, wherein said oscillation means (7) comprise one or more rods (71), each one of which has a first end (72) hinged to said container (2) and a second end (73) hinged to said frame (6) of said conveyor belt (5).

3. Cutter-mixer wagon (1) according to claim 1, wherein said sliding means (8) comprise one or more pins (81) fixed to said frame (6) that supports said conveyor belt (5) and one or more brackets (82) fixed to said container (2), each one provided with a slot (83) to which one of said pins (81) is slidingly coupled.

4. Cutter-mixer wagon (1) according to claim 1, wherein said operating means comprise at least one jack (9) consisting of a cylinder (91) fixed to said container (2) and of a stem (92), the end of which is hinged to a support (93) fixed to the frame (6) of said conveyor belt (5).

5. Cutter-mixer wagon (1), according to claim 4, wherein said jack (9) is an hydraulic jack.

6. Cutter-mixer wagon (1) according to claim 1, wherein said conveyor belt (5) is positioned between at least one pair of drums (51, 52) supported by said frame (6), at least one of said drums being coupled to a rotation means (151).

7. Cutter-mixer wagon (1) according to claim 6, wherein said rotation means is an hydraulic motor (151).

8. A cutter-mixer wagon for processing plant residues including:

a container having an opening for the introduction of said plant residues and at least one rotary screw feeder positioned in a lower portion of the container for cutting and mixing the plant residues therein;

at least one unloading door positioned on a side of the container;

a conveyor belt for extracting the cut-and-mixed plant residues from the container through said unloading door; and a frame for supporting the conveyor belt on the container;

connecting means for pivotally connecting the frame to the container between a retracted position and a working position comprising pivot means connecting the container to an intermediate portion of the frame, and sliding means connecting the lower portion of the frame to the container;

operating means reciprocally operable between first and second positions and connected between the container and the frame for carrying out reciprocal movement of the sliding means to operate the frame between a substantially vertical position corresponding to the retracted position and an inclined position corresponding to the working position.

9. The cutter-mixer wagon according to claim 8, wherein the pivot means comprises at least one rod, having a first end hinged to the container and a second end hinged to the frame.

10. The cutter-mixer wagon according to claim 8, wherein said sliding means comprises at least one pin fixed to the frame for supporting the conveyor belt and at least one bracket fixed to the container, the bracket being formed with a slot to slidably receive the pin therein.

11. The cutter-mixer wagon according to claim 8, wherein the operating means comprises at least one extendable actuator connected between the container and the frame.

12. The cutter-mixer wagon according to claim 8, wherein the conveyor belt includes a pair of drums for carrying the belt therebetween and being supported by the frame, and at least one rotation means coupled to at least one of the drums for driving the belt.

13. The cutter-mixer wagon according to claim 12, wherein the rotation means comprises a hydraulic motor.

14. The cutter-mixer wagon according to claim 8, wherein the extendable actuator comprises a hydraulic jack.

15. The cutter-mixer wagon according to claim 8, wherein the pivot means includes a link having opposite end portions pivotally connected between the container and the belt and the sliding means comprises a slidable bearing for supporting the conveyor belt, being located between the pivot means and the actuator for allowing the conveyor to move between said retracted and working positions.

\* \* \* \* \*